Nov. 17, 1959     A. F. BROZ     2,913,218

VALVE CONSTRUCTION

Filed May 6, 1957

Low Pressure Against Butterfly Valve

High Pressure Behind Sleeve

INVENTOR.
ALBERT F. BROZ
BY
William C. Babcock
ATTORNEY

United States Patent Office 2,913,218
Patented Nov. 17, 1959

2,913,218

VALVE CONSTRUCTION

Albert F. Broz, Long Beach, Calif., assignor to Idaho Maryland Mines Corporation, San Francisco, Calif., a corporation of Nevada Application May 6, 1957, Serial No. 657,263

2 Claims. (Cl. 251—173)

The present invention relates generally to the field of valves, and more particularly to a butterfly-type valve that can be used equally well in controlling the flow of either high or low pressure fluids.

Although valves of the butterfly type have been used for many years in the control of fluids, one of the operational disadvantages of such valves heretofore available has been that they did not afford an effective shut-off for the fluids being handled, particularly hot air and gases, and normally had to be especially designed for the particular fluid pressure encountered.

A major object of the present invention is to provide an improved butterfly-type valve that can be motor actuated, and one that is adapted to handle both high and low pressure fluids at either room or elevated temperatures.

Another object of the invention is to supply a butterfly valve of such design that the greater the fluid pressure, the greater the force exerted to seal the circumferential edge portion of the valve plate to the seat it removably engages when in a closed position.

A further object of the invention is to furnish a valve having high closing efficiency both as to high and low pressure fluids which is of extremely simple mechanical structure, can be fabricated from standard commercially available materials, requires a minimum of maintenance attention, and can be fabricated in a plant equipped with standard machine tools.

These and other objects and advantages of the invention will become apparent from the following description of a preferred form thereof, and from the accompanying drawing illustrating same, in which.

Figure 3:
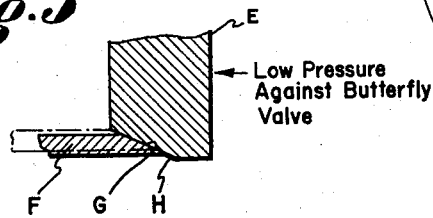
Figure 4:
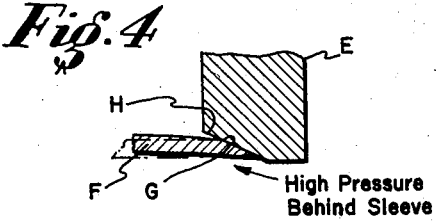

Figure 3 is a fragmentary cross-sectional view of a circumferential edge portion of the butterfly plate showing the manner in which it seals against a seat to shut off the flow of low pressure fluid; and Figure 4 is a fragmentary cross-sectional view of a circumferential edge portion of the butterfly plate showing the manner in which it seals against a seat to shut off the flow of high pressure fluid.

Figure 2:
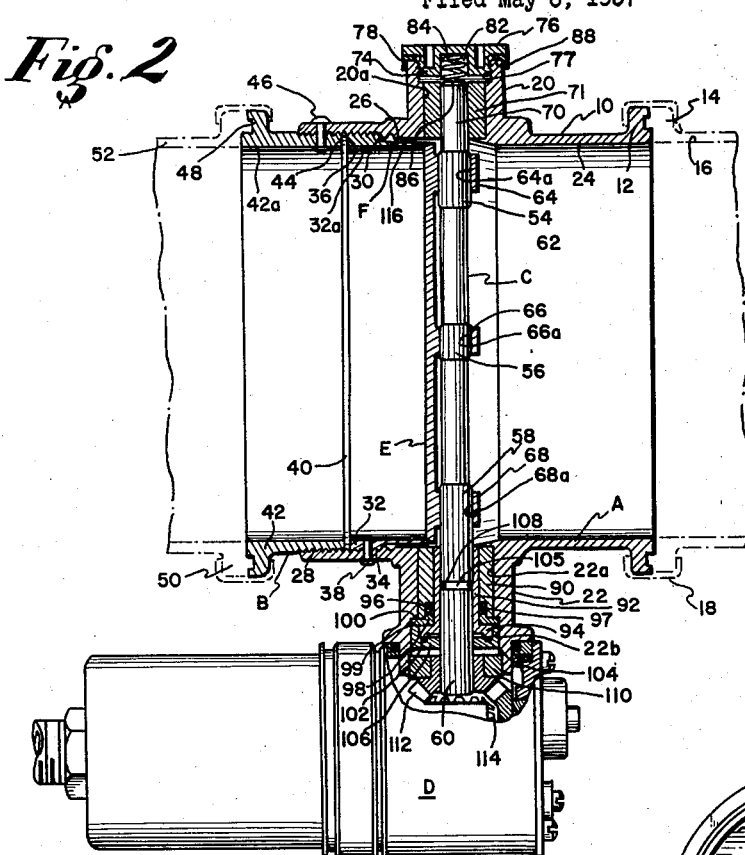
Figure 2 is a combined, top plan and transverse cross-sectional view of the valve taken on line 2—2 of Figure 1.
Figure 1:
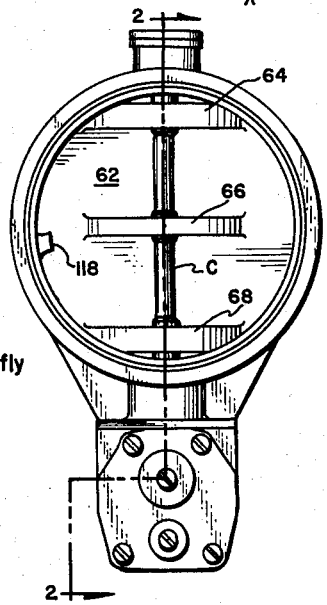
Figure 1 is an end elevational view of the valve and the actuator used in the operation thereof.

Referring to the drawing, the invention will be seen to include a first tubular housing A in which a second tubular housing B is coaxially disposed relative thereto in sealed communication therewith. A transversely positioned shaft C is situated in housing A, which when rotated by an actuator D, serves to pivot an eccentrically mounted circular valve plate E from an open position substantially parallel to the longitudinal axis of housing A to the closed position as shown in Figures 1 and 2.

Tubular housing B (Figure 2) within the confines of housing A develops into a thin-walled cylindrical resilient section F that terminates on the inwardly disposed end thereof in a circumferentially extending, tapered seat G adapted to be sealingly engaged by the tapered circumferentially extending edge H of valve plate E. The manner in which section F and seat G are deformed from their positions shown in phantom line to that shown in solid line when valve plate E assumes a closed position to shut off the flow of low pressure fluid, is best shown in Figure 3. Figure 4 illustrates the manner in which the section F and seat G are deformed when the valve plate E obstructs the flow of high pressure fluid.

In detail, the first housing A includes a tubular shell 10 that is preferably formed of a light-weight metal such as aluminum or an alloy thereof. The outer end of shell 10 terminates in a circular flange 12 that abuts and seals against a companion flange 14 mounted on the end of the line or conduit 16 through which the fluid enters that is to be controlled by the invention. Flanges 12 and 14 are removably locked together by a conventional clamp 18.

Shell 10 is formed with two oppositely disposed bosses 20 and 22 through which bores 20a and 22a, respectively, extend. The interior of shell 10 defines a fluid-conducting bore 24 of circular transverse cross section which is in coaxial alignment with a second bore 26, and threads 28 are formed on the interior surface thereof. Bore 26 is larger in diameter than bore 24 and forms a circular body shoulder 30 at the junction therewith.

Although from an operational standpoint housing B comprises but a single unit, structurally it is preferable to fabricate it from several components. In Figure 2 it will be seen that housing B comprises a cylindrical member 32 having threads 34 formed on the exterior surface thereof that engage threads 28. The resilient tubular section F extends toward shaft C from the inwardly disposed end of member 32. The end of member 32 opposite that from which section F extends, terminates in a flat circumferentially extending face 36. After member 32 has been threaded into housing A to a position where the tapered seat G thereof can sealingly engage the tapered face H of valve plate E when the valve plate is in a closed position as shown in Figures 2, 3 and 4, a rivet or other elongate holding means 38 is positioned in aligned bores formed in member 32 and shell 10 to maintain member 32 in this particular position. A circular fluid-sealing ring 40 formed of a suitable resilient material is disposed within shell 10 and abuts against face 36. A second cylindrical member 42 having threads formed on a part of the exterior surface thereof is caused to engage threads 28, and is rotated until the inwardly disposed end 44 of member 42 abuts against sealing ring 40. By rotation member 42 is caused to exert sufficient pressure on sealing ring 40 to deform the ring into sealing contact with the interior surface of shell 10. When member 42 is disposed in the position just described, a rivet 46 is inserted in two aligned bores formed in shell 10 and member 42 to lock the member 42 in this pressure exerting position. The wall thickness of members 32 and 42 is such that the interior bores 32a and 42a defined thereby are in coaxial alignment with the surface defining bore 24. The outer end of member 42 terminates in a circular flange 48 that can abut against a companion flange 50 formed on an end of a tube 52 into which fluid discharges after flowing through the invention.

Shaft C is formed with four enlarged, longitudinally serrated portions 54, 56, 58 and 60 that are in spaced relationship. The upstream side 62 of valve plate E is provided with three transversely spaced, parallel ribs 64, 66 and 68. Serrated bores 64a, 66a and 68a extend transversely through ribs 64, 66, and 68, which bores engage serrated shaft portions 54, 56 and 58 to not only eccentrically support valve plate E on shaft C, but prevent rotation of the valve plate relative to the shaft as well.

An end portion 70 of shaft C is rotatably supported in a cylindrical bearing 71 mounted in bore 20a of boss 20. Threads 72 are formed in the outer portion of bore 20a and are engaged by a threaded plug 74 that has a flat head 76. A sealing gasket 78 is mounted on the external face 80 of boss 20, and is compressed when the interior face of head 76 is brought into pressure contact therewith. A cavity 82 is formed in plug 74 in which a compressed helical spring 84 is mounted that contacts the end face 86 of shaft C and at all times urges the shaft toward actuator D.

A bearing 90 is mounted in bore 22a of boss 22 that rotatably supports a cylindrical sleeve 92 having a circular flange 94 formed on the outer end thereof. A longitudinally serrated bore extends through sleeve 92 and slidably engages serrated shaft portions 58 and 60. Bearing 90 has an annulus-shaped recess 96 formed on the outer face thereof in which a resilient O-ring 97 is positioned.

A spacer 98 is provided that includes a ring-shaped flange 99, the outer circumferential portion of which abuts against a circular body shoulder 100 defined in boss 22 at the junction of bore 22a with a first counter bore 22b of larger internal diameter. A portion of spacer 98 extends into recess 96 and serves to compress O-ring 97 to prevent escape of fluid from between the contacting surfaces of bearing 90 and sleeve 92. A circular recess 102 is formed in the outer surface of a seal plug 106 in which recess a resilient sealing ring 104 is disposed. Plug 106 is mounted on shaft portion 60 and serves to maintain ring 104 in sealing contact with flange 94.

A circumferentially extending recess 105 is formed between shaft portions 58 and 60 in which an O-ring 108 is positioned that seals against the interior surface of sleeve 92. A thrust bearing 110 is mounted in the outer end portion of boss 22 which rotatably supports a first beveled gear 112 that is rigidly affixed to shaft C. Gear 112 is driven by a second beveled gear 114 that forms a part of actuator D, which for purposes of illustration herein is an electrically operated actuator manufactured by the Rotomite Corporation of 1425 Santa Fe Ave., Long Beach, California. The actuator D forms no part of the present invention and hence will not be described in structural detail. Likewise, the manner in which actuator D is mounted on or affixed to the invention will not be discussed in detail for the means of so doing varies with the construction of the make or brand of the particular actuator employed.

An annulus-shaped space 116 separates the tubular section F in which seat G is formed from the interior surface defining the bore 24. A circumferentially extending tapered recess is formed on the interior surface of tubular member 10 upstream from shaft C to permit rotation of valve plate E to the fully open position.

The length and wall thickness of the tubular section F, as well as the resilient characteristics of the material defining same, are all critical in order for the valve to operate satisfactorily with both low and high pressure fluids. An efficient shut-off of fluid at low pressure is obtained when the valve plate is rotated to cause face H of valve plate E to engage seat G, with sufficient torque being exerted on shaft C by actuator D to deform the resilient section F from the position shown in phantom line in Figure 3 to that shown in solid line in the same figure. When the pressure on the fluid being shut off rises to a point where fluid would tend to seep between the seat G and face F, the pressure of the fluid that has entered space 116 presses against the entire external surface of section F and deforms same inwardly from the position shown in phantom line in Figure 4 to that shown in solid line in the same figure. Thus, at high pressure the fluid pressure against the outer surface of the tubular section F acts radially inwardly and augments the contact pressure between the beveled edges C and H resulting from the closing torque applied to shaft C in obtaining an effective shut-off of the fluid entering the valve from pipe or conduit 16. In Figure 2 it will be seen that sealing ring 40 prevents fluid in space 116 from escaping therefrom between threads 28 and 34. A stop 118 is provided that projects inwardly from shell 10 and is contacted by a portion of face 62 of valve plate E after the valve plate is disposed in the fully closed position.

In use, the operation of the invention is extremely simple. The valve is connected between the upstream pipe 16 and downstream pipe 52 (Figure 2) and the valve so positioned that stop 118 is on the upstream side. Actuator D is then connected to the source of energy (not shown) that is used in operating the valve. When it is desired to shut off the flow of either low or high pressure fluid passing through the valve, the actuator D is energized to cause rotation of shaft C and valve plate E with sufficient force that resilient section F is deformed (Figure 3) prior to valve plate E contacting stop 118.

The length of section F, the wall thickness thereof, and the resilient characteristics of the material forming same are critical, and must be so related to one another that when the fluid pressure is sufficiently great that the fluid tends to seep past seat G and face H, this action will be counteracted by section F in providing sufficient exposed area adjacent space 116 whereby the fluid will deform section F inwardly (Figure 4) to augment the sealing effect obtained in the manner shown in Figure 3. It will be particularly noted that the valve plate E is eccentrically mounted on shaft C in order that the tapered face H thereof can be brought into sealing contact with seat G to deform the inner end portion of section F within the elastic limits of the material defining same. Centering of valve plate E relative to housings A and B is obtained by at all times urging shaft C toward boss 22 by means of the compressed spring 84. Movement of shaft C and valve plate E toward boss 22 is resisted by thrust bearing 110. Escape of fluid through bores 20a and 22a in bosses 20 and 22, respectively, is prevented by fluid-sealing components already described in detail and which need not be repeated.

Although the form of the invention herein shown and described is fully capable of achieving the objects and providing the advantages hereinbefore mentioned, it is to be understood that it is merely illustrative of the presently preferred embodiment thereof and that I do not mean to limit myself to the details of construction herein shown and described other than as defined in the appended claims.

I claim:

1. A valve for controlling the flow of either low or high pressure fluid, comprising: a tubular housing having an inner wall; a tubular section mounted within the housing and including a downstream end portion and a resilient upstream end portion having a free end, the downstream end portion being in sealing engagement with the housing and the upstream end portion being spaced from the housing so as to provide an annulus-shaped space between the outer surface of the upstream end portion and the inner wall of the housing; an inwardly extending tapered valve seat formed in the free end of the upstream portion of the section; and a plate-like valve member having a tapered peripheral edge mounted within the housing upstream from the tubular section for movement between an open position in which the tapered edge of the valve member is out of sealing engagement with the valve seat and a closed position in which said tapered edge is in abutting sealing relationship with the valve seat so as to exert an axial sealing force therebetween, the upstream portion of the tubular section flexing inwardly with increased fluid pressure in the annulus-shaped space so as to increase the radial sealing force between the valve seat and the valve member.

2. A valve for controlling the flow of either low or high pressure fluid, comprising: a tubular housing having an inner wall; a tubular section mounted within the housing and including a downstream end portion and a resilient cylindrical upstream end portion having a free end, the downstream end portion being in sealing engagement with the housing and the upstream end portion being spaced from the housing so as to provide an annulus-shaped space between the outer surface of the upstream end portion and the inner wall of the housing; a tapered valve seat formed in the free end of the upstream portion so as to extend inwardly in the downstream direction; and a circular plate-like valve member positioned within the housing and containing a tapered peripheral edge which faces the valve seat when the valve member extends transversely of the housing, the outer diameter of the valve member being less than the inner minor diameter of the housing and at least as great as the outer diameter of the cylindrical upstream end portion of the tubular section, the valve member being pivotally mounted for movement between an open position in which the tapered edge of the valve member is out of sealing engagement with the valve seat and a closed position in which the valve member is disposed transversely of the housing with the tapered edge in abutting sealing relationship with the valve seat so as to exert an axial sealing force therebetween, the upstream portion of the tubular section flexing radially inwardly with increased fluid pressure in the annulus-shaped space so as to increase the radial sealing force between the valve seat and the valve member.

References Cited in the file of this patent

UNITED STATES PATENTS

| | | |
|---|---|---|
| 2,059,656 | Ring | Nov. 3, 1936 |
| 2,529,572 | Raybould | Nov. 14, 1950 |
| 2,586,927 | Fantz | Feb. 26, 1952 |
| 2,655,942 | Dougherty | Oct. 20, 1953 |
| 2,661,182 | Kipp | Dec. 1, 1953 |
| 2,789,785 | Woods | Apr. 23, 1957 |

FOREIGN PATENTS

| | | |
|---|---|---|
| 639,043 | France | Mar. 5, 1928 |
| 22,932 | Great Britain | Feb. 8, 1912 |
| 114,152 | Great Britain | June 13, 1918 |
| 753,860 | Great Britain | Aug. 1, 1956 |
| 759,111 | Great Britain | Oct. 10, 1956 |
| 764,946 | Great Britain | Jan. 2, 1957 |
| 781,183 | Great Britain | Aug. 14, 1957 |